United States Patent
Vaya

(10) Patent No.: US 9,171,232 B2
(45) Date of Patent: Oct. 27, 2015

(54) METHOD AND SYSTEM FOR A SELECTION OF A SOLUTION TECHNIQUE FOR A TASK

(71) Applicant: Xerox Corporation, Norwalk, CT (US)

(72) Inventor: Shailesh Vaya, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 349 days.

(21) Appl. No.: 13/717,744

(22) Filed: Dec. 18, 2012

(65) Prior Publication Data

US 2014/0169674 A1 Jun. 19, 2014

(51) Int. Cl.
*G06K 9/62* (2006.01)

(52) U.S. Cl.
CPC .......... *G06K 9/6227* (2013.01); *G06K 2209/01* (2013.01)

(58) Field of Classification Search
None
See application file for complete search history.

(56) References Cited

U.S. PATENT DOCUMENTS

2011/0060627 A1* 3/2011 Piersol et al. ................... 705/10

OTHER PUBLICATIONS

"Anti-Virus Comparative; On-demand Detection of Potentially Unwanted Applications", PUA Test, Dec. 2010, www.av-comparatives.org, pp. 1-7.*
Rice et al."The Fourth Annual Test of OCR Accuracy", from http://www.expervision.com/testimonial-world-leading-and-champion-ocr/annual-test-of-ocr-accuracy-by-us-department-of-energy-doe-university-of-nevada-las-vegas-unlv, 1995, 45 pages total.*
Sarah J. McCarthy, "Competitive Edge: Using Gamification as an Effective OCR Crowdsourcing Motivator", Sep. 15, 2012, 21 pages total.*

* cited by examiner

*Primary Examiner* — Brian P Werner
(74) *Attorney, Agent, or Firm* — Jones Robb, PLLC

(57) ABSTRACT

A method, system, and computer program product for selecting a solution technique from a plurality of solution techniques for accomplishing a task is provided. The plurality of solution techniques are ranked according to a set of parameters. A first set of solutions are then obtained based on each of the plurality of solution techniques until at least the first predefined number of solutions from the first set of solutions matches with the corresponding solution from the second set of solutions. The second set of solutions corresponds to correct solutions for the task. Thereafter, one of the plurality of solution techniques is selected for which at least the first predefined number of solutions from the first set of solutions matches with the corresponding solution from the second set of solutions.

23 Claims, 3 Drawing Sheets

METHOD AND SYSTEM FOR A SELECTION OF A SOLUTION TECHNIQUE FOR A TASK

TECHNICAL FIELD

The presently disclosed embodiments are related to method and system for selecting a solution technique to accomplish a task. More particularly, the presently disclosed embodiments are related to a method and system for selecting a solution technique from a plurality of solution techniques to accomplish the task, based on the evaluation of sample datasets.

BACKGROUND

Numerous solution techniques are available for organizations to perform variety of tasks, including but not limited to, recognition of text from images, creation of digital albums, document translation, detection of anomalies in the video data etc. The solution techniques include but are not limited to various software based applications and various crowdsourcing services.

For example, the task of recognition of handwritten text from scanned images is accomplished using various optical or intelligent character recognition algorithms. The Optical Character Recognition (OCR) algorithms have been developed for decades, and their performance has been reliable. Lately, crowdsourcing has also emerged as a favorable option for character/word/sentence recognition of handwritten texts at a reduced cost.

Due to the availability of a large number of techniques for accomplishing various tasks, the primary problem associated with it is in choosing the best technique for completing any given task at an optimal cost.

SUMMARY

According to the embodiments illustrated herein, there is provided a computer implementable method for selecting a solution technique from a plurality of solution techniques for a task. The method includes a step of ranking the plurality of solution techniques according to a set of parameters. The set of parameters includes at least accuracy. A first set of solutions is then obtained based on each of the plurality of solution techniques until at least each of a first predefined number of solutions from the first set of solutions matches with a corresponding solution from a second set of solutions. The second set of solutions corresponds to correct solutions for the task. Thereafter, one of the plurality of solution techniques is selected for which at least the first predefined number of solutions from the first set of solutions matches with the corresponding solution from the second set of solutions.

According to the embodiments illustrated herein, there is provided a system for selecting a solution technique from a plurality of solution techniques for a task. The system includes a ranking module and a selection module. The ranking module is configured for ranking the plurality of solution techniques according to at least one of an accuracy or cost. The selection module is configured for obtaining a first set of solutions based on each of the plurality of solution techniques until at least each of a first predefined number of solutions from the first set of solutions matches with a corresponding solution from a second set of solutions. The second sets of solutions are obtainable based on a primary solution technique having the highest accuracy. The selection module is further configured for selecting one of the plurality of solution technique for which at least the first predefined number of solutions from the first set of solutions matches with the corresponding solution from the second set of solutions.

According to the embodiments illustrated herein, there is provided a computer program product for selecting a solution technique from a plurality of solution techniques for a task. The computer program code includes program instruction means for ranking the plurality of solution techniques according to accuracy. The plurality of solution techniques includes software applications and crowdsourcing services. The computer program code further includes program instruction means for obtaining a first set of solutions based on each of the plurality of solution techniques until at least each of a first predefined number of solutions from the first set of solutions matches with a corresponding solution from a second set of solutions. The second set of solutions corresponds to correct solutions for the task. The computer program code further includes program instruction means for selecting one of the plurality of solution techniques for which the first predefined number of solutions from the first set of solutions matches with the corresponding solution from the second set of solutions.

BRIEF DESCRIPTION OF DRAWINGS

The accompanying drawings illustrate various embodiments of systems, methods, and embodiments of various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
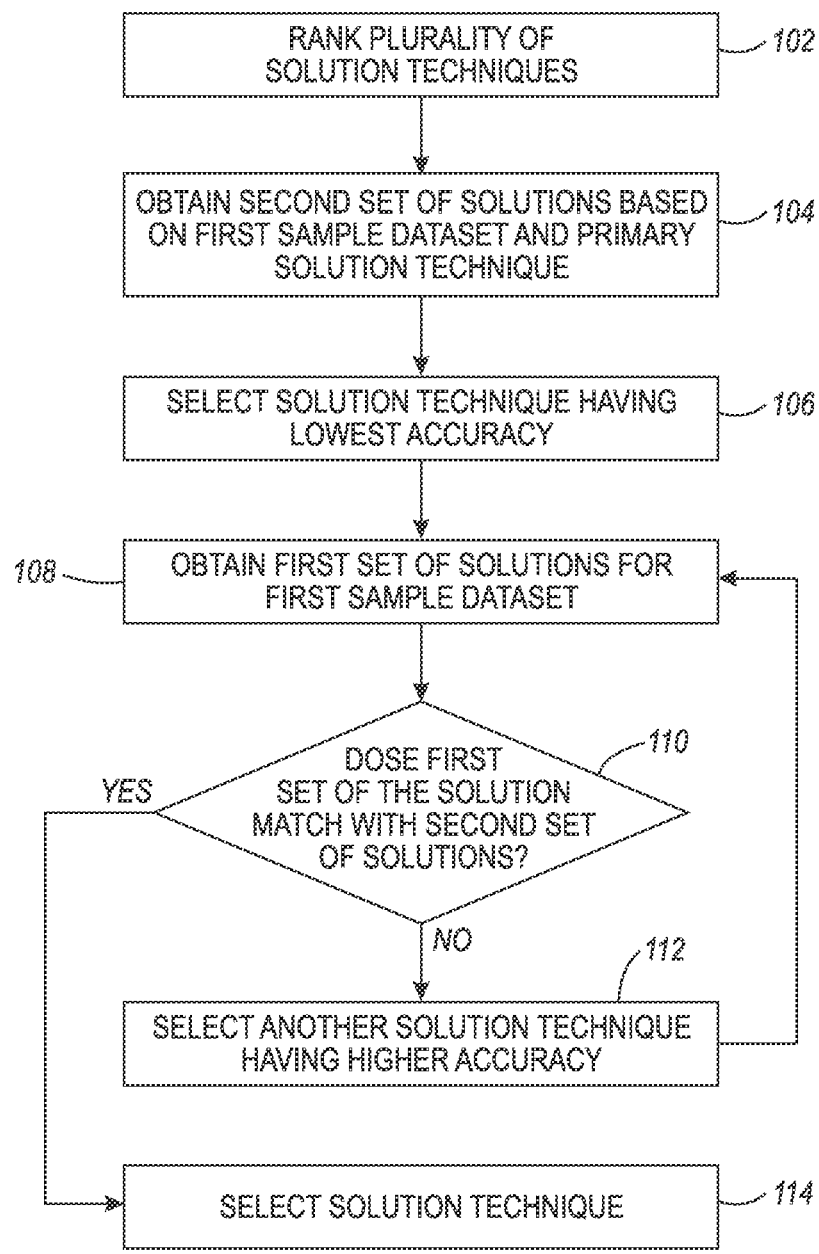
FIG. 1 is a flow diagram illustrating a method for selecting a solution technique from a plurality of solution techniques for a task in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) so described may include a particular feature, structure, characteristic, property, element, or limitation, but that not every embodiment or example necessarily includes that particular feature, structure, characteristic, property, element, or limitation. Furthermore, the repeated use of the phrase "in an embodiment" does not necessarily refer to the same embodiment.

Definitions: The following terms shall have, for the purposes of this application, the respective meaning set forth below.

"Crowdsourcing" refers to distributing tasks by soliciting the participation of defined groups of users. A group of users may include, for example, individuals responding to a solicitation posted on a certain website such as Amazon Mechanical Turk or Crowd Flower.

"Crowdworker" refers to a worker or a group of workers that may perform one or more tasks that generate data contributing to a defined result. The crowdworker may include an internet user. Hereinafter, "crowdsourced workforce," "crowdworker," "remote worker", and "crowd" may be interchangeably used.

"Task" refers to any work that is to be completed by a/an machine/algorithms/internal workforce/crowdsourced workforce. Various examples of the tasks include, but are not limited to, digital album creation, character recognition, form filling, and detection of anomalies in the video data, document translation, and so forth. For simplicity, the following description addresses the task of character recognition (e.g., form filling) in an image as an example; however, a person having ordinary skill in the art will appreciate that the disclosed method may readily be extended to be implemented for other types of tasks.

"Optical Character Recognition" (OCR) refers to electronic conversion of scanned images of handwritten, typewritten or printed text into machine-encoded text.

"Sample dataset" refers to a portion or segment of a complete dataset. For example, if the complete dataset includes an image containing one thousand words, then the sample dataset may be a portion or segment of the image that may include twenty words.

"Solution technique" refers to a software application or a crowdsourcing service/platform for accomplishing a task.

FIG. 1 is a flow diagram illustrating a method for selecting a solution technique from a plurality of solution techniques for a task in accordance with at least one embodiment.

At step 102, a plurality of solutions techniques are ranked. The plurality of solution techniques is configured to accomplish the task (e.g., character recognition). In an embodiment, the plurality of solution techniques includes software-based solutions (e.g., OCR applications). In another embodiment, the plurality of solution techniques includes crowdsourcing services. For example, for the tasks involving character recognition, crowdsourcing services include crowdsourcing platforms offering character recognition tasks (e.g., form filling or text identification from images).

The plurality of solution techniques are ranked according to a set of parameters. In one embodiment, the set of parameters includes accuracy. In another embodiment, the set of parameters includes cost. The plurality of solution techniques are ranked according to either the decreasing order or the increasing order of accuracy and/ or cost.

In an embodiment, the values of the accuracy and cost for the plurality of solution techniques are predefined and known. It should be apparent that the ongoing description is not limited with respect to techniques for determining the accuracy and cost for the plurality of solution techniques.

At step 104, a second set of solutions are obtained based on a first sample dataset and a primary solution technique. In an embodiment, in case of the optical character recognition task, the first sample dataset may include a portion of the image, containing a predefined number of words. It will be apparent to a person having ordinary skill in the art that the first sample dataset may vary depending upon the nature of the task.

In an embodiment, the primary solution technique is selected from the plurality of solution techniques. In an embodiment, the primary solution technique has the highest accuracy among the plurality of solution techniques. After the selection of the primary solution technique, the first sample dataset is processed using the primary solution technique to obtain the second set of solutions. In an embodiment, the primary solution technique may be a software-based solution or a crowdsourcing platform. In an embodiment, the second set of solutions may be considered as correct solutions since the primary solution technique has highest accuracy.

In an embodiment, if the primary solution technique is the crowdsourcing platform such as Amazon's Mechanical Turk™ or CrowdFlower™, then the first sample dataset is sent to a first group of crowd workers. It will be apparent to a person having ordinary skill in the art that any known techniques can be used for creating the crowd tasks. Various crowdworkers (hereinafter referred to as remote workers) are registered on the crowdsourcing platform. The remote workers will view the task and opt to complete it for a fee. In an embodiment, the first sample dataset is sent to a first set of remote workers along with instructions for completing the task. Thus, the second set of solutions is obtained from the remote workers. In an embodiment, in case of character recognition, the second set of solution includes the words recognized from the first sample dataset, by the remote workers.

At step 106, a solution technique having the lowest accuracy is selected from the plurality of solution techniques. In an embodiment, the solution technique may be software-based solution or crowdsourcing platform different from the primary solution technique.

At step 108, a first set of solutions is obtained for the first sample dataset. In an embodiment, the first sample dataset is processed using the solution technique and the corresponding first set of solutions is obtained. For example, if the solution technique is software application for OCR, the first set of solutions includes words recognized from the first sample dataset, by the software application.

At step 110, it is determined if the first set of the solutions matches with the second set of solutions. The determination is made based on the comparison of the first set of solutions and the second set of solutions. In an embodiment, each of the first set of solutions is compared with corresponding solution from the second set of solutions.

If the first set of solutions does not match with the second set of solutions, the step 112 is followed. At step 112, another solution technique having the higher accuracy than the solution technique (e.g., previously tested solution technique), is selected from the plurality of solution techniques. Thereafter, step 108 and step 110 are followed again until the first set of solutions obtained by processing the first sample dataset using another solution technique, matches with the second set of solutions.

If the first set of solutions matches with the second set of solutions at step 110, the step 114 is followed. At step 114, the solution technique of the plurality of solution techniques is selected for performing the task. Similarly, each of the plurality of solution technique may be checked until the first set of solutions matches with the second set of solutions.

In an embodiment, if the first set of solutions does not match with the second set solutions for any of the plurality of solution techniques (except from the primary solution technique), the primary solution technique may be used for accomplishing the task.

Figure 2:
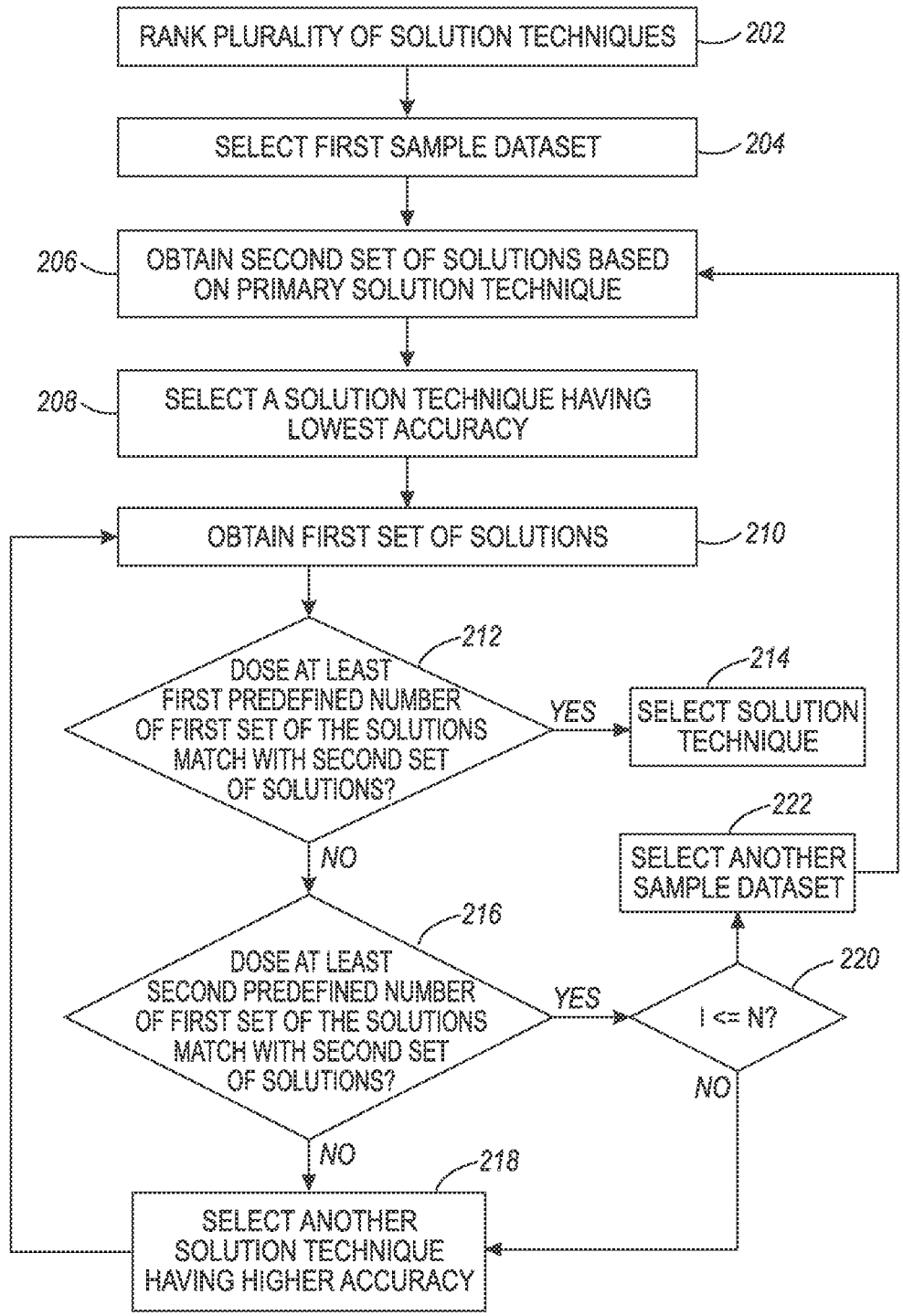
FIG. 2 is a flow diagram illustrating a method for selecting a solution technique from a plurality of solution techniques for a task in accordance with at least one embodiment.

FIG. 2 is a flow diagram illustrating a method for selecting a solution technique from a plurality of solution techniques for a task in accordance with at least one embodiment.

At step 202, the plurality of solution techniques is ranked. In an embodiment, the plurality of solution techniques may include software-based solutions. In another embodiment, the plurality of solution techniques may include crowdsourcing services. In yet another embodiment, the plurality of solution techniques may include a combination of software-based solutions and crowd sourcing services.

In an embodiment of the present disclosure, the plurality of solution techniques is ranked according to a set of parameters. In one embodiment, the set of parameters considered for ranking the plurality of solution techniques includes accuracy. Thus, based on the accuracy of each of the plurality of solution techniques, the plurality of solution techniques is ranked. In another embodiment, the set of parameters considered for ranking the plurality of solution techniques includes cost. Thus, based on the cost incurred for each of the plurality of solution techniques, the plurality of solution techniques is ranked. It will be apparent to a person having ordinary skill in the art that any other suitable parameters such as average speed, average job quality, accuracy, end-to-end delay, collaboration, or the like can be used to rank the plurality of solution techniques without departing from the scope of the disclosed embodiments.

At step 204, the first sample dataset is selected. In an embodiment, the first sample dataset is selected from the dataset that is to be operated as a part of the task. It will be apparent to a person having ordinary skill in the art that the sample dataset is, in general, a very small percentage of the entire dataset. For example, in the task of optical character recognition of an image containing one thousand words, the sample data set may only include the section of the image that contains twenty words out of the total dataset of one thousand words. In an embodiment, the first sample dataset is randomly extracted from the dataset.

At step 206, the second set of solutions is obtained based on the primary solution technique. In an embodiment, the primary solution technique is selected from the plurality of solution techniques. The primary solution technique selected from the plurality of solution techniques has the highest accuracy among all the solution techniques within the plurality of solution techniques. It will be apparent to a person having ordinary skill in the art that any other suitable criteria other than accuracy may be used to select the primary solution technique from the plurality of solution technique without departing from the scope of the disclosed embodiments.

In an embodiment, after the selection of the primary solution technique, the primary solution technique is applied onto the first sample dataset to obtain the second set of solutions. In an embodiment, the second set of solutions may be considered as correct solutions since the primary solution technique has highest accuracy.

At step 208, the solution technique having the lowest accuracy is selected from the plurality of solution techniques.

At step 210, the first set of solutions is obtained. In an embodiment, the selected solution technique is applied to the first sample dataset to obtain the first set of solutions. The first set of solutions includes one or more solutions.

At step 212, the first set of the solutions are compared with the second set of solutions. If the at least first pre-defined number of the first set of the solutions matches with the second set of solutions, then step 214 is followed. At step 214, the solution technique is selected for the task. It will be apparent to a person having ordinary skill in the art that any known matching technique may be used in order to match the first set of solutions with the second set of solutions without departing from the scope of the disclosed embodiments.

If the at least first pre-defined number of the first set of the solutions does not match with the second set of solutions, then step 216 is followed. At step 216, it is checked if at least second pre-defined number of solutions matches with the second set of solutions. The second pre-defined number is a numerical value and is less than the first pre-defined number. In an embodiment, the first predefined number and the second predefined number are provided by a user or preconfigured.

In an embodiment, if the at least second pre-defined number of the first set of solutions does not match with the second set of solutions, then step 218 is followed. At step 218, another solution technique having the higher accuracy than the solution technique (e.g., a previously tested solution technique) is selected from the plurality of solution techniques, and thereafter the step 210 is followed.

In an embodiment, if the at least second pre-defined number of the first set of solutions matches with the second set of solutions, then step 220 is followed. At step 220, it is determined whether a variable i<=N. Where, "N" represents any chosen numerical value. In an embodiment, the value of N is provided by the user. Here, the value of N indicates a maximum number of times any solution technique is tested again using a new sample dataset when the number of matching solutions between the first set of solution and the second set of solution, is between the first predefined number and the second predefined number.

If the variable i is found to be less than or equal to N, then step 222 is followed. At step 222, another sample dataset is selected. After the selection of another (or new) sample dataset, the step 206 is followed. In an embodiment, the new sample dataset selected is specified as a second sample dataset. The second sample dataset is randomly determined.

Figure 3:
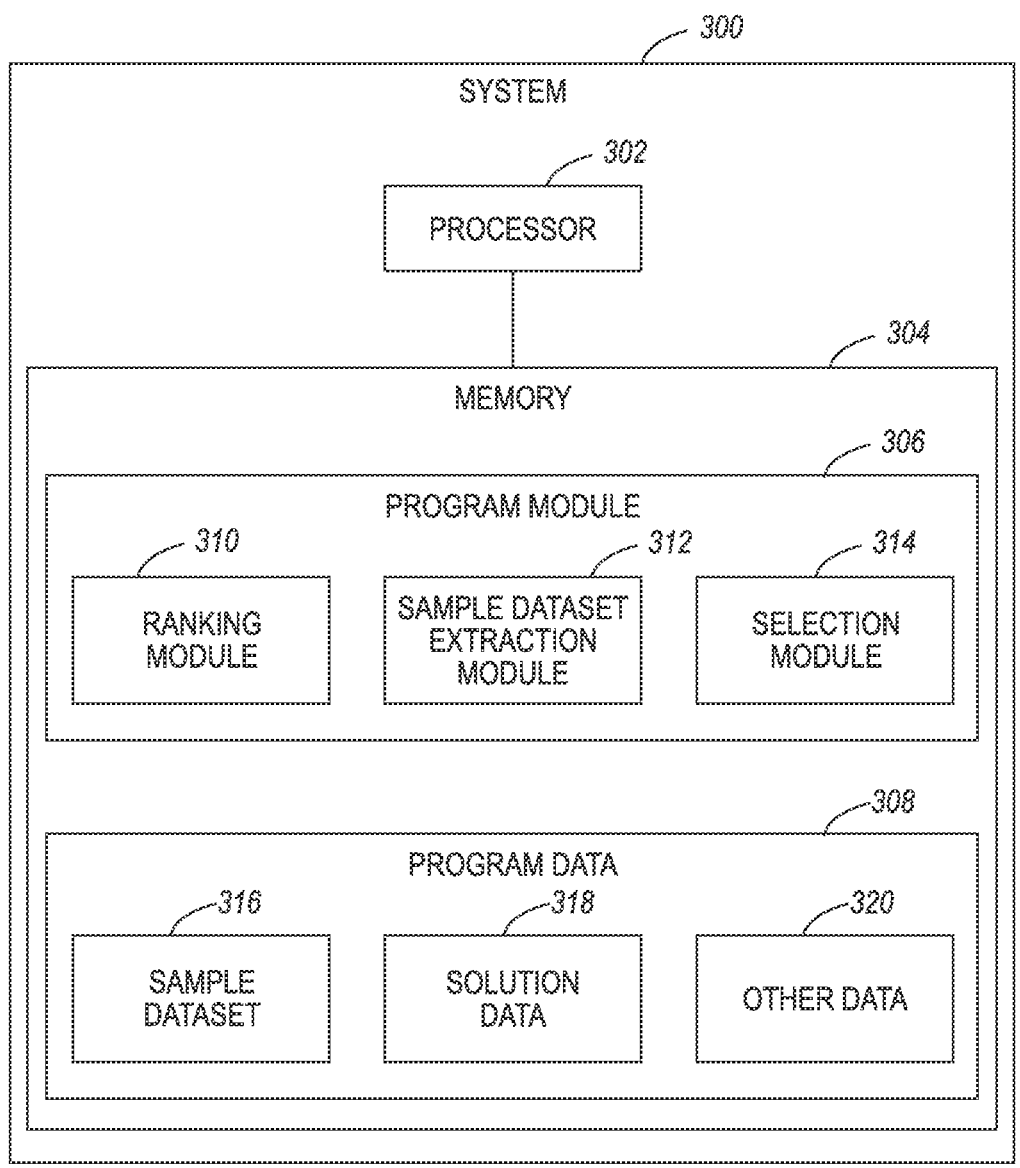
FIG. 3 is a block diagram illustrating a system for selecting a solution technique from a plurality of solution techniques for a task in accordance with at least one embodiment.

FIG. 3 is a block diagram illustrating a system 300 for selecting a solution technique from a plurality of solution techniques for a task in accordance with at least one embodiment. In an embodiment, the system 300 corresponds to a computing device such as a personal digital assistant (PDA), a smartphone, a tablet PC, a laptop, a personal computer, a mobile phone, a digital living network alliance (DLNA)-enabled device, or the like.

The system 300 includes a processor 302 and a memory 304. The processor 302 is coupled with the memory 304. The processor 302 is configured to execute a set of instructions stored in the memory 304 to perform one or more operations. The processor 302 fetches the set of instructions from the memory 304 and executes them. The processor 302 can be realized through a number of processor technologies known in the art. Examples of the processor can be an X86 processor, a RISC processor, an ASIC processor, or any other processor. In an embodiment, the processor 302 includes a graphics processing unit (GPU) that executes the set of instructions to perform one or more processing operations.

The memory 304 is configured to store the set of instructions or modules. Some of the commonly known memory implementations can be, but are not limited to, a random access memory (RAM), a read-only memory (ROM), a hard disk drive (HDD), and a secure digital (SD) card. The memory 304 includes a program module 306 and a program data 308. The program module 306 includes a set of instructions that can be executed by the processor 302 to perform specific actions on the system 300. The program module 306 includes a ranking module 310, a sample dataset extraction module 312, and a selection module 314. It will be understood by a person having ordinary skills in the art that the set of instructions are stored in the memory 304 in conjunction with various hardware of the system 300 to perform various operations.

The program data 308 includes a sample dataset 316, a solution data 318, and other data 320. The sample dataset 316, the solution data 318, and the other data 320 are storage mediums that stores the data submitted from and/or required by the ranking module 310, the sample dataset extraction module 312, and the selection module 314. In an embodiment, the sample dataset 316, the solution data 318, and the other data 320 can be implemented using technologies including, but not limited to Oracle®, IBM DB2®, Microsoft SQL Server®, Microsoft Access®, PostgreSQL®, MySQL® and SQLite®, and the like. The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The sample dataset 316 includes various data that will be used as the first sample dataset and the second sample dataset. The other data 320 holds information on the plurality of solution techniques. The information may include, but are not limited to, names of the plurality of solution techniques, type (e.g., software based, crowdsourcing services/platforms, etc.), values of the cost and the accuracy associated with the plurality of solution techniques, and so forth.

The ranking module 310 is configured for ranking the plurality of solution techniques. In an embodiment, the ranking module 310 retrieves the information related to the plurality of solution techniques from the other data 320. After the retrieval of the information, the ranking module 310 ranks the plurality of solution techniques based on at least one of the accuracy and/or the cost. In one embodiment, the ranking module 310 is configured for ranking the plurality of solution techniques in decreasing order based on at least one of the accuracy or the cost. In another embodiment, the ranking module 310 is configured for ranking the plurality of solution techniques in increasing order based on at least one of the accuracy or the cost. It will be apparent to a person having ordinary skill in the art that any suitable parameters other than accuracy and cost may be used to rank the plurality of solution techniques without departing from the scope of the disclosed embodiments. The ranking module 310 then stores the ranks of the plurality of solution techniques in the other data 320.

The sample dataset extraction module 312 is configured for extracting the first sample dataset from the sample dataset 316. In an embodiment, the sample dataset extraction module 312 randomly extracts the data for the first sample dataset from the sample dataset 316. In another embodiment, the sample dataset extraction module 312 randomly extracts the data for second sample dataset from the sample dataset 316.

In an embodiment, the selection module 314 selects a primary solution technique from the plurality of solution techniques stored in the other data 320. The primary solution technique has the highest accuracy among all the solution techniques within the plurality of solution techniques. The primary solution technique is applied onto the first sample dataset in order to obtain the second set of solutions. The selection module 314 then stores the second set of solutions in the solution data 318.

Thereafter, the selection module 314 selects a solution technique from the plurality of solution techniques. In an embodiment, the selected solution technique has the lowest accuracy. The solution technique is applied to the first sample dataset in order to obtain the first set of solutions. The selection module 314 then stores the first set of solutions in the solution data 318.

The selection module 314 compares the first set of solutions with the corresponding solutions in the second set of solutions. Thereafter, the selection module 314 determines the suitable solution technique for accomplishing the task based on the number of matching solutions between the first set of solutions and the second set of solutions. This is further explained in conjunction with the FIG. 1 and FIG. 2.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, reducing costs by choosing the most optimal OCR application/crowd sourcing platforms for document processing or any other tasks for corporate or other organizations. The advantages may further include increasing returns on investments and improving process performance by automating their business processes related to form processing. Also other advantages include freeing up resources for other uses by using a suitable crowdsourcing platform for performing the tasks, converting fixed costs to variable costs, and improving speed to market.

Various embodiments of the method and system for selecting a solution technique from a plurality of solution techniques for a task have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art that are also intended to be encompassed by the following claims.

What is claimed is:

1. A method for selecting a solution technique from a plurality of solution techniques to process a task, the method comprising:
   ranking, by a processor, the plurality of solution techniques according to an accuracy associated with each of the plurality of solution techniques;
   receiving, by the processor, a first set of solutions for a first sample dataset, from a first solution technique selected from the plurality of solution techniques, wherein the first solution technique has lowest accuracy among the plurality of solution techniques and the first solution technique is ranked lowest among the plurality of solution techniques;
   receiving, by the processor, the first set of solutions for the first sample dataset from a second solution technique when a number of correct solutions in the first set of solutions, received from the first solution technique, is less than a first predefined number of solutions, wherein a second set of solutions corresponds to correct solutions for the first sample dataset, and wherein the second solution technique has the accuracy greater than the accuracy of the first solution technique and the second solution technique has a next highest rank to the rank of the first solution technique; and
   selecting, by the processor, one of the plurality of solution techniques for processing the task, wherein the first predefined number of solutions provided by the selected solution technique matches with the corresponding solution from the second set of solutions.

2. The method of claim 1, wherein the task corresponds to at least one of Optical Character Recognition (OCR), language translation, and digital photo album creation.

3. The method of claim 1, wherein the plurality of solution techniques comprises software based solutions.

4. The method of claim 1, wherein the plurality of solution techniques comprises crowdsourcing services.

5. The method of claim 1, wherein the plurality of solution techniques are ranked according to decreasing order of accuracy.

6. The method of claim 1, wherein the plurality of solution techniques are ranked according to a cost associated with each of the plurality of solution techniques.

7. The method of claim 1, wherein the second set of solutions is obtained based on a primary solution technique, wherein the primary solution technique has a highest accuracy among the accuracy associated with each of the plurality of solution techniques.

8. The method of claim 1 further comprising rejecting, by the processor, one or more solution techniques for which a second predefined number of solutions from the first set of solutions do not match with corresponding solution from the second set of solutions.

9. The method of claim 1 further comprising randomly extracting, by the processor, the first sample dataset and a second sample dataset.

10. The method of claim 9 further comprising receiving, by the processor, the first set of solutions for the second sample dataset for a solution technique when the number of correct solutions in the first set of solutions, received for the first sample dataset, is between the first predefined number and the second predefined number.

11. The method of claim 1, wherein the first predefined number is equal to the number of solutions in the second set of solutions.

12. A system for selecting a solution technique from a plurality of solution techniques to process a task, the system comprising:
   one or more processors configured to:
   rank the plurality of solution techniques according to an accuracy associated with each of the plurality of solution techniques;
   receive a second set of solutions for a first sample dataset from a primary solution technique, wherein the primary solution technique has a highest accuracy among the accuracy associated with each of the plurality of solution techniques;

receive a first set of solutions for the first sample dataset from a first solution technique selected, from the plurality of solution techniques, wherein the first solution technique has lowest accuracy among the plurality of solution techniques and the first solution technique is ranked lowest among the plurality of solution techniques;

receive the first set of solutions for the first sample dataset from a second solution technique when a number of correct solutions in the first set of solutions, received from the first solution technique, is less than a first predefined number of solutions, wherein a second set of solutions corresponds to correct solutions for the first sample dataset, and wherein the second solution technique has the accuracy greater than the accuracy of the first solution technique and the second solution technique has a next highest rank to the rank of the first solution technique; and select one of the plurality of solution technique for processing the task, wherein the first predefined number of solutions provided by the selected solution technique matches with the corresponding solution from the second set of solutions.

13. The system of claim 12, wherein the one or more processors are configured to rank the plurality of solution techniques in decreasing order of the accuracy.

14. The system of claim 12, wherein the one or more processors are further configured to extract the first sample dataset.

15. The system of claim 12, wherein the one or more processors are configured to rank the plurality of solution techniques in increasing order on the basis of at least one of the accuracy or the cost.

16. The system of claim 12, wherein the one or more processors are further configured to reject one or more solution techniques when at least a second predefined number of solutions from the first set of solutions do not match with corresponding solution from the second set of solutions.

17. The system of claim 12, wherein the one or more processors are further configured to receive the first set of solutions for a second sample dataset for a solution technique when the number of correct solutions in the first set of solutions, received for the first sample dataset, is between the first predefined number and the second predefined number.

18. A non-transitory computer program product for use with a computer, the non-transitory computer program product comprising a computer-usable data carrier storing a computer readable program code for selecting a solution technique from a plurality of solution techniques to process a task, the computer readable program code is executable by a processor in the computer to:

rank the plurality of solution techniques according to an accuracy associated with each of the plurality of solution techniques, wherein the plurality of solution techniques comprises software applications and crowdsourcing services;

receive a first set of solutions for a first sample dataset, from a first solution technique selected from the plurality of solution techniques, wherein the first solution technique has lowest accuracy among the plurality of solution techniques and the first solution technique is ranked lowest among the plurality of solution techniques;

receive, by the processor, the first set of solutions for the first sample dataset, from a second solution technique when a number of correct solutions in the first set of solutions, received from the first solution technique, is less than, wherein a second set of solutions corresponds to correct solutions for the first sample dataset, and wherein the second solution technique has the accuracy greater than the accuracy of the first solution technique and the second solution technique has a next highest rank to the rank of the first solution technique; and select one of the plurality of solution techniques for processing the task, wherein the first predefined number of solutions provided by the selected solution technique matches with the corresponding solution from the second set of solutions.

19. The computer program product of claim 18, wherein the computer readable program code is further executable by the processor to reject one or more solution techniques for which at least a second predefined number of solutions from the first set of solutions do not match with corresponding solution from the second set of solutions.

20. The computer program product of claim 18, wherein the computer readable program code is further executable by the processor to receive the first set of solutions for a second sample dataset for a solution technique when the number of correct solutions in the first set of solutions, received for the first sample dataset, is between the first predefined number and the second predefined number.

21. A method for selecting a solution technique from a plurality of solution techniques for a Character Recognition task, the method comprising:

ranking the plurality of solution techniques according to an accuracy, and wherein the plurality of solution technique comprises crowdsourcing services and software based solutions;

receiving, by the processor, a first set of solutions for a first sample dataset from a first solution technique selected from the plurality of solution techniques, wherein the first solution technique has lowest accuracy among the plurality of solution techniques and the first solution technique is ranked lowest among the plurality of solution techniques;

receiving, by the processor, the first set of solutions for the first sample dataset from a second solution technique when a number of correct solutions in the first set of solutions, received from the first solution technique, is less than, wherein a second set of solutions corresponds to correct solutions for the first sample dataset, and wherein the second solution technique has the accuracy greater than the accuracy of the first solution technique and the second solution technique has a next highest rank to the rank of the first solution technique; and selecting, by the processor, one of the plurality of solution techniques for processing the Character Recognition task, wherein the first predefined number of solutions provided by the selected solution technique matches with the corresponding solution from the second set of solutions.

22. The method of claim 21, wherein the crowdsourcing services comprise one or more crowdsourcing platforms that offers the task of the character recognition to their associated crowdworkers.

23. The method of claim 21, wherein the software based solutions comprise one or more computer applications for performing optical character recognition.

* * * * *